United States Patent [19]

Miller

[11] Patent Number: 4,470,473
[45] Date of Patent: Sep. 11, 1984

[54] LOW RANGE AUTOMATIC WEIGHING DEVICE

[75] Inventor: Walter E. Miller, Milford, Conn.

[73] Assignee: Pitney Bowes Inc., Stamford, Conn.

[21] Appl. No.: 395,776

[22] Filed: Jul. 6, 1982

[51] Int. Cl.³ .......................... G01G 1/38; G01G 1/26
[52] U.S. Cl. .................................... 177/212; 177/248
[58] Field of Search ............................... 177/212, 248

[56] References Cited

U.S. PATENT DOCUMENTS 4,411,328 10/1983 Hubbard .......................... 177/212

Primary Examiner—George H. Miller, Jr.
Attorney, Agent, or Firm—Melvin J. Scolnick; Albert W. Scribner; William D. Soltow, Jr.

[57] ABSTRACT

A weighing device is disclosed which comprises a frame, a pan element for supporting a load to be weighed, a channel member connected to the pan for retaining a plurality of weight elements in a vertically movable manner, a motor supported within the frame, a shaft member operatively connected to and extending from the motor and a plurality of vertically movable support members having top end portions adapted to receive and lift one of the weight elements. Two arms are secured to the shaft member and each extends in a direction toward the support members. In one embodiment of the present invention, each support member includes a cam track therein and each of the arms include a cam follower adapted to ride in the cam track. In another embodiment, each support member includes a cam follower extending therefrom and each of the arms include a cam track adapted to receive the cam follower such that the follower can ride in the cam track. A switch is provided for energizing the motor when the pan is depressed by a load. The motor turns the shaft member and thereby guides each of the arms alternately into contact with successive support members in a step-by-step manner (thereby guiding each of the cam followers and cam tracks into contact) to vertically move a number of the support members and thereby lift a corresponding number of the weights substantially equal to the weight of the load.

7 Claims, 7 Drawing Figures

LOW RANGE AUTOMATIC WEIGHING DEVICE

BACKGROUND OF THE DISCLOSURE

I. Field of the Invention

This invention relates to weighing devices, and more particularly to low range automatic balance devices having an optical readout system.

II. Description of the Prior Art

Many low range type of scales and balances have been devised and described in the prior art. Many of these devices, however, exhibit numerous problems. A basic disadvantage of a scale as compared to a balance is that scales are sensitive to regional gravitational variations and temperature variations. Several of the low range type of scales and balances described in the prior art do not have the degree of accuracy in weighing that is required in various situations, such as the weighing requirements that exist within the postal field. Furthermore, many of the known weighing devices are not automatic and do not provide for a direct visual readout of the weight of the object being weighed. In addition, many of these devices are relatively complex in design, difficult to manufacture, require the use of high cost materials and are expensive.

One example of a prior art type of low range scale is described in U.S. Pat. No. 2,716,546. The scale illustrated by this patent, when in a rest position, has a plurality of counterweights (balls) supported on carrier by a spring. When a weight (e.g., a letter) is placed on the weighing pan, the spring extends, thereby successively depositing balls on a plurality of supports which are of different vertical heights so that during the descent of the weighing pan, balls are successively deposited from a shelf onto the supports in a one after the other fashion. A linkage connected to the shelf, and responsive to its vertical height, operates a pointer for indicating the weight on the pan. The scale includes a bimetal strip for compensating for variations in the force of the spring resulting from changes in temperature. The sensitivity of the spring and the required adjusting of each of the counterweights to a particular height are two of the problems related to this type of scale which can alter the accuracy of any weight measurements made thereon. Other examples of scales disclosed by the prior art and relating to the present invention are illustrated in U.S. Pat. Nos. 213,898; 276,701; 1,661,556; 1,944,071; 3,108,647; 4,106,580; and 4,235,296.

In commonly assigned and copending application Ser. No. 361,310, filed Mar. 24, 1982 and entitled "A Low Range Automatic Weighing Device" by D. W. Hubbard there is disclosed a low range automatic balance which overcomes many of the disadvantages of the type of low range weighing devices disclosed in the prior art. Basically, this device comprises a frame, a pan element for supporting a load to be weighed, a channel member connected to the pan for retaining a plurality of weight elements in a vertically movable manner, a motor supported within the frame and a shaft member operatively connected to and extending from the motor and supporting the pan element. A plurality of support members are provided that have top end portions adapted to receive and lift one of the weight elements. A camming arm is secured to the shaft member and extends in a direction toward the support members. A switch is provided for energizing the motor when the pan is depressed by a load. The motor turns the shaft member and guides the camming arm into contact with successive support members in a step-by-step manner to place a number of the support members in an extended position and lift a corresponding number of the weights substantially equal to the weight of the load. Because of the order in which the weight elements are positioned on the pan it is possible that this can result in a slight uneven weight distribution on the pan. This can tend to increase the friction between the motor shaft and the pan.

Alternate type of weighing devices which have resolved the above-described type of problems are described in my commonly assigned and copending application Ser. Nos. 395,775, filed July 6, 1982 and 395,777, filed July 6, 1982, both entitled "Low Range Automatic Weighing Device".

SUMMARY OF THE INVENTION

It is therefore a primary object of the present invention to overcome many of the disadvantages of the type of low range weighing devices disclosed in the prior art and provide a balance which is highly efficient.

It is a further object of the present invention to provide a low range automatic balance which is highly sensitive and highly accurate in its weight measurements.

It is a further object of the present invention to provide a low range automatic balance which has particular use in the postal field and which features a direct visual readout of the weight of the object being weighed.

It is still a further object of the present invention to provide a balance which is relatively simple in design, easy to manufacture, uses low cost materials in its construction and is relatively inexpensive.

The foregoing objects and others are accomplished in accordance with the present invention by providing a weighing device comprising: a frame, a pan element for supporting a load to be weighed, means connected to said pan for retaining a plurality of weight elements in a vertically movable manner, a motor supported within the frame and a shaft member operatively connected to and extending from the motor and supporting the pan element. In one embodiment of the present invention a plurality of vertically movable support members are provided each having top end portions adapted to receive and lift one of said weight elements and each including a cam track therein. First and second arms are secured to the shaft member and extend in a direction toward the support members, each of the arms including a cam follower that is adapted to ride in the cam track. Switching means is provided for energizing the motor when the pan is depressed by a weighted load, the motor turning the shaft member and guiding the cam followers alternately into contact with successive cam tracks in a step-by-step manner to vertically move a number of the support members and thereby lift a corresponding number of the weights substantially equal to the weight of the load. In another embodiment of the present invention a plurality of vertically movable support members are provided each having top end portions adapted to receive and lift one of the weight elements and each including a cam follower extending therefrom. First and second arms are secured to the shaft member and extend in a direction toward the support members, each of the arms including a cam track adapted to receive the cam followers such that the followers can ride in the cam tracks. Switching means is provided for energizing the motor when the pan is depressed by a weighted load, the motor turning the shaft member and guiding the cam tracks alternately into contact with successive cam followers in a step-by-step manner to vertically move a number of the support members and thereby lift a corresponding number of the weights substantially equal to the weight of the load.

BRIEF DESCRIPTION OF THE DRAWINGS

For a better understanding of the invention, as well as other objects and further features thereof, reference is made to the following detailed disclosure of this invention taken in conjunction with the accompanying drawings wherein.

DESCRIPTION OF THE PREFERRED EMBODIMENTS

Figure 1:
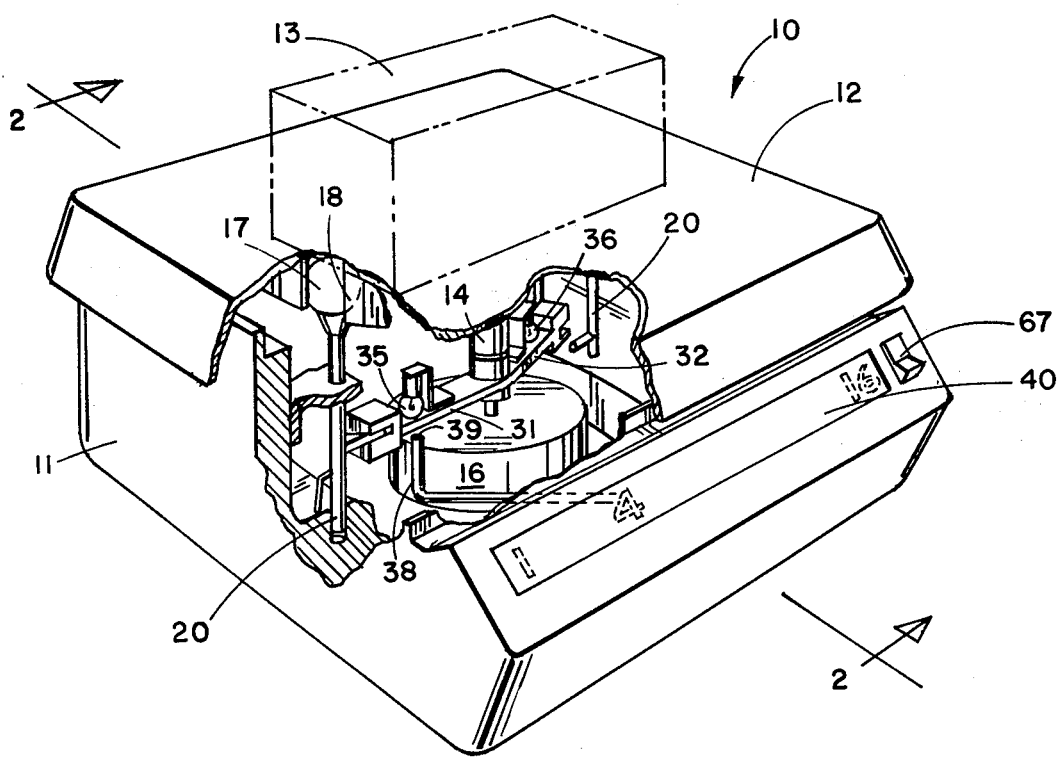
FIG. 1 is a perspective view, partly in section, of an embodiment of a balance in accordance with the features of the present invention.
Figure 2:
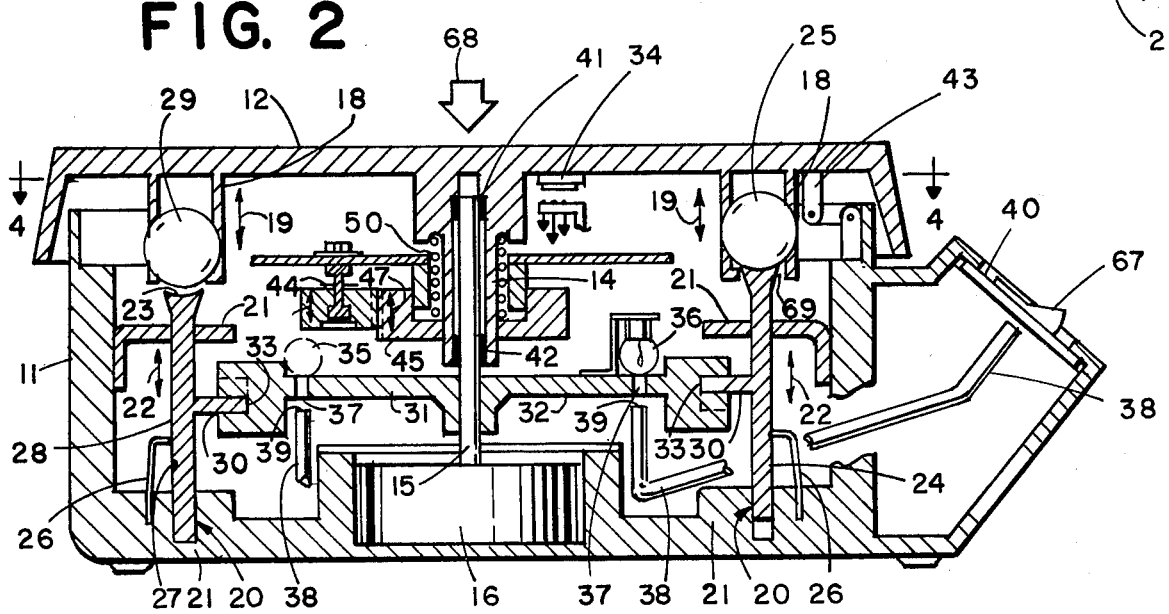
FIG. 2 is a longitudinal sectional view taken along line 2—2 of FIG. 1.
Figure 4:
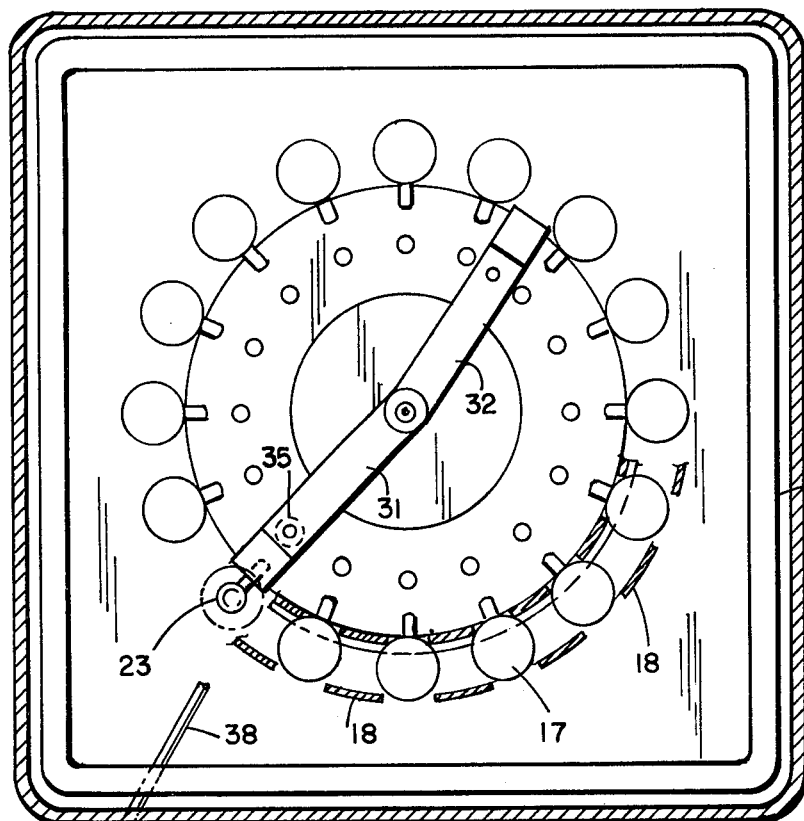
FIG. 4 is a top sectional view taken along line 4—4 of FIG. 2.

Referring now to the drawings, and particularly to FIGS. 1 and 2, there is shown an embodiment of a weighing device (balance) in accordance with the preferred features of the present invention. The weighing device (balance) 10 includes frame 11 encasing the components thereof. The balance includes a pan element or weighing pan 12 used for supporting a load 13 that is to be weighed by the balance. Preferably extending from the bottom portion of pan 12 is a hollow shaft member 14. The weighing pan is supported by a shaft member 15 that lies within hollow shaft member 14. Shaft member 15 is operatively connected to and extends from a motor 16. The pan includes and supports plurality of weight elements, preferably in the form of balls 17, that are retained in a ball retaining ring 18 that encircles the bottom portion of the pan in a closed path (see FIG. 4). Ball retaining ring 18 extends down from the bottom portion of pan 12 preferably in the form of a U-shaped channel member. Each of balls 17 are retained in the retaining ring in a manner which permits each of the balls to move vertically as shown by arrow 19.

Figure 3:
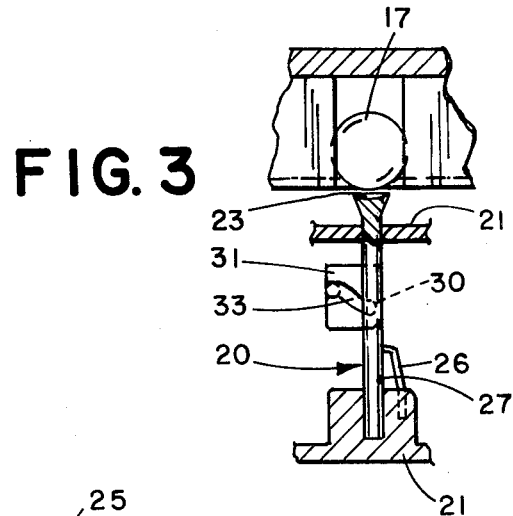
FIG. 3 is an elevational view of the support member assembly shown in FIG. 2.

There is shown in FIGS. 2 and 3 an embodiment for a support member configuration in accordance with the present invention. As shown, support members 20 are arranged and positioned in frame 11 such that they travel vertically. In accordance with a preferred embodiment of the present invention these support members can be arranged in a concentric path. In accordance with the specific example of a balance described hereinbelow, sixteen support members are arranged in a circular path, i.e. support members are positioned at about 22½ degree intervals. Each of the support members are secured within guide plates 21 which position the support members such that they can move vertically as indicated by arrow 22, and each have at their opposite end portions means that is adapted to receive and lift one of the balls 17. This means can be, for example, in the form of a cup-like end portion 23 formed at the top of each of the support members. The support members are secured to the frame within guide plates 21 in a manner which positions a cup-like end portion directly under the vertical path of travel of each of the balls 17. Thus, there is one support member 20 for each ball 17. Each cup-like end portion 23 is adapted to receive and lift one of the weight elements (balls) when the corresponding support member is in a vertically extended position as exemplified by support member 24 and ball 25. When in this position each of the support members 20 has cooperating therewith, a corresponding stop element such as, for example, snap clip 26 which snaps into an opening 27 within support member 20 when the support member is vertically raised, and thereby supports ball 17 in a raised position. It is in this position that the support member rests and is prevented from falling vertically. Note, support member 28 which is an example of a support member that is not supporting a ball, and thus where the corresponding ball 29 is supported by the ball retaining ring 18. Each of the support members also include a cam follower 30 extending therefrom. The function of each of the cam followers 30 is explained in detail hereinbelow. The support member (including the cam follower 30 and cup-like end portion) can be formed of one molded piece of plastic.

Secured to shaft member 15 are a first arm 31 and a second arm 32, both being positioned to extend in a direction toward the support members 20. The arms are secured to and rotate with shaft member 15. A preferred embodiment for arms 31 and 32 is an arm which includes a cam track 33 located at the end portion thereof. Cam tracks 33 are adapted to receive the cam followers 30 extending from each of support members 20. In operation, as arms 31 and 32 are rotated on shaft 15 by motor 16 about a closed path, the cam follower 30 of a support member which is not supporting a weight element (ball) 17 (see support member 28) is engaged into the cam track located within arm 31 or 32 thereby lifting the support member vertically within guide plates 21 such that the support member subsequently lifts and supports a ball 17 (see support member 24). To provide a more even weight distribution on pan 12 (i.e., a more even weight distribution of weight elements 17 on the pan) and thereby reduce the friction between hollow shaft member 14 and the motor shaft 15 during operation of the balance, the two arms 31 and 32 are positioned on shaft 15 to travel in a manner whereby the arms alternately cause the lifting of weight elements 17. It is preferred in accordance with the present invention that the arms travel in two different sectors and that each arm travel through a sector of about 180 degrees and in accordance with the specific example given herein, alternately cause the lifting of eight of the balls 17.

A switch 34 is electrically connected to motor 16 and energizes the motor when pan 12 is depressed by a load 13 in the manner as more fully described hereinbelow. The switch is preferably a double pole type electrical displacement switch having one portion thereof mounted on the bottom portion of pan 12 (see FIG. 2).

Balance 10 includes a read-out system for visually displaying the weight of the load. This system can include, for example, lamps 35 and 36 secured to each of arms 31 and 32 so that the lamps revolve along with the arms. Located directly under each of lamps 35 and 36 is an opening 37 which permits light to be projected from lamps 35 and 36 to any of a plurality of light pipes 38 as arms 31 and 32 rotate around their respective paths of travel. One end portion 39 of each of the light pipes are arranged about a path positioned directly under the closed path of travel of lamps 35 and 36 (see FIG. 4). Each of the other end portions of each of the light pipes is positioned by a number on display panel 40 that corresponds to the different measurements of weight.

The primary function of motor 16 is to turn shaft member 15 and thereby guide arms 31 and 32 about a path alternately into contact with successive support members 20 that are in a lowered position (or away from vertically extended support members, i.e. when the motor operates in reverse in the manner as described hereinbelow) in a step-by-step manner, i.e. a motor capable of moving one pole position for every input pulse. Examples of the type of motors that can be used to accomplish this function include a stepping motor or a DC servo motor with a shaft encoder. The invention will hereinafter be described using a stepping motor for illustrative purposes. In accordance with the present invention any conventional stepping motor can be used. With a sixteen division scale (one using sixteen weight elements (balls) 17), the number of poles on the stepping motor would be selected to be a multiple of sixteen so that the poles would then determine the intermediate stopping points at each of the positions where a ball is located and is to be vertically lifted or lowered. A thirty-two (32) pole stepping motor would be used in accordance with the example described herein such that arms 31 and 32 would have intermediate stopping points about every 11¼ degrees. In order to provide for the alternate vertical lifting of support members 20, the arms are positioned on shaft member 15 such that when arm 31 is positioned at a support member 20 in its sector, arm 32 is positioned between two support members 20 or about 11¼ degrees away from a support member in its sector of travel.

As illustrated in FIG. 2, pan 12 is supported on shaft member 15 in a manner which enables the pan to float on the shaft member by spring 50. The pan lies on the spring in such a manner whereby it can move vertically (float) on shaft member 15. Preferably two bearings 41 and 42 are provided between shaft member 15 and the inside surface of hollow shaft member 14 which permit the shaft member to freely rotate within the hollow shaft member and also allow pan 12 to move freely in a vertical direction on shaft member 14. Also provided is a means to prevent any rotational movement of pan 12 without interferring with the vertical movement of the pan. This can be accomplished by the use of a freely pivoting linkage device 43 secured at one end to the pan and at the other end to frame 11.

There are several types of systems that can be used with the balance of the present invention to permit one to "zero" the balance. For example, illustrated in FIG. 2 is an adjusting screw 44 which permits one to "zero" the balance. With no weight on pan 12, the pan will settle to a certain position on spring 50. By turning the adjusting screw, element 45 moves up or down as indicated by arrow 46 thereby raising or lowering the pan via spring 50 (see arrow 47) so that it can be brought to such a position that with no weight thereon, the two poles of switch 34 will not touch but will lie in contiguous relation and thus all of the support members 20 will be in a vertically lowered position with all of balls 17 being supported within ball retaining ring 18.

Figure 6:
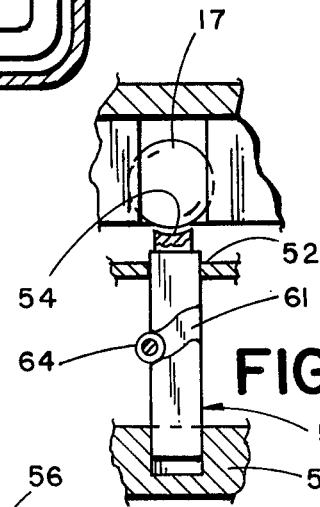
FIG. 6 is an elevational view of the support member assembly shown in FIGS. 5.
Figure 5:
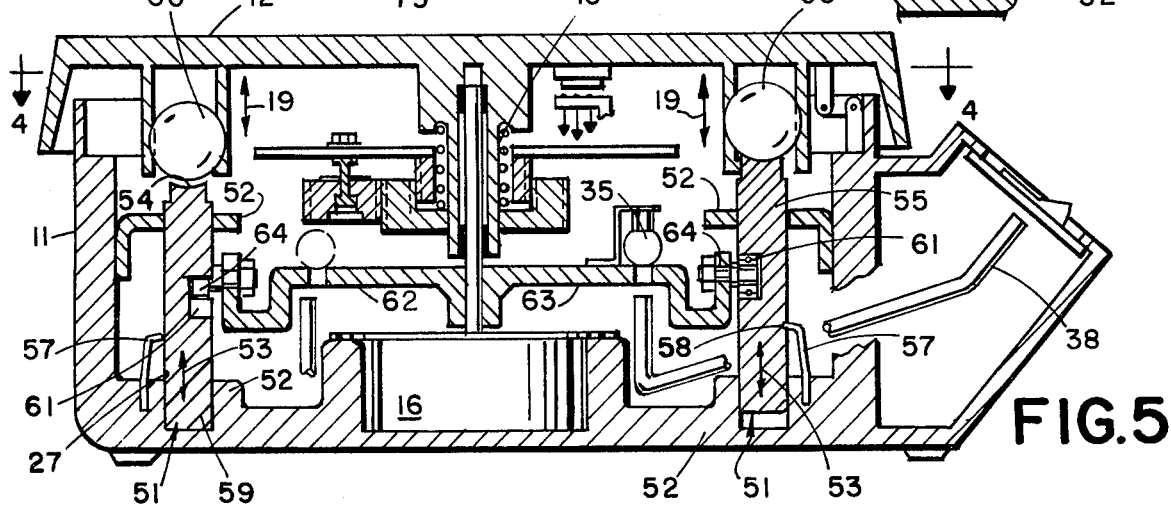
FIG. 5 is a longitudinal sectional view illustrating a further embodiment of a support member arrangement in accordance with the features of the present invention.

There is shown in FIGS. 5 and 6 another embodiment for a support member configuration in accordance with the present invention. As shown, a plurality of vertically movable support members 51 are arranged in the frame 11. In accordance with one of the preferred embodiments of the present invention, these support members can be arranged in a concentric path. In accordance with the specific example of a balance described hereinbelow, sixteen support members are arranged in a circular path. Each of the support members are secured within guide plates 52 which position the support members such that they can move vertically as indicated by arrow 53, and each have at their opposite end portions means that is adapted to receive and lift one of the balls 17. This means can be, for example, in the form of a cup-like end portion 54 formed at the top of each of the support members. The support members are secured to the frame within guide plates 52 in a manner which positions a cup-like end portion directly under the vertical path of travel of each of the balls 17. Thus, there is one support member for each ball 17. Each cup-like end portion 54 is adapted to receive and lift one of the weight elements (balls) when the corresponding support member is in a vertically extended position as exemplified by support member 55 and ball 56. When in this position, each of the support members 51 has cooperating therewith, a corresponding stop element snap clip 57 which snaps into opening 58 within support member 51 when the support member is vertically raised, and thereby supports ball 56 in a raised position. It is in this position that the support member rests and is prevented from falling vertically. Note, support member 59 which is an example of a support member that is not supporting a ball, and thus where the corresponding ball 60 is supported by the ball retaining ring 18. Each of the support members also include a cam track 61 therein. The function of the cam tracks in each of the support members is explained in detail hereinbelow. Like the embodiment shown in FIGS. 2 and 3, the entire support member 51 can be formed of one molded piece of plastic.

Secured to shaft member 15 are a first arm 62 and a second arm 63 both being positioned to extend in a direction toward the support members 51. The arms are secured to and rotate with shaft member 15. In accordance with the embodiment shown in FIGS. 5 and 6, arms 62 and 63 include a cam follower 64 projecting from the end portions of each of the arms. Cam tracks 61 are adapted to receive the cam followers 64 extending from arms 62 and 63. In operation, as arms 62 and 63 are rotated on shaft 15 by motor 16 about a closed path, a cam follower on one of arms 62 or 63 is engaged into the cam track 61 of one of support members 51 (see support member 55) thereby vertically lifting the support member such that the support member subsequently lifts and supports a ball 56. The two arms are positioned on shaft 15 to alternately cause the lifting of weight elements 17. It is preferred in accordance with the present invention that the arms travel in two different sectors and that each arm travel through a sector of about 180 degrees and in accordance with the specific example given herein, alternately cause the lifting of eight of the balls 17.

The balance in accordance with the present invention has particular use as a low range automatic balance in the postal field. Although the balance described herein is for measuring the weight of objects of less than or equal to one pound, it is to be noted that low range balances in accordance herewith can include balances for measuring objects, practically speaking, up to about four pounds. A one pound balance in accordance with the features of the present invention would employ sixteen one ounce balls (weight elements) each made of some dense material, preferably steel, and each being accurately machined to a precise diameter, and thus a precise weight of one ounce. The entire balance has a primary overall advantage that it can be constructed very inexpensively by being made out of different plastic materials. This would include such parts as, for example, frame 11, support members 20, 51, pan 12, shaft member 15, etc.

Figure 7:
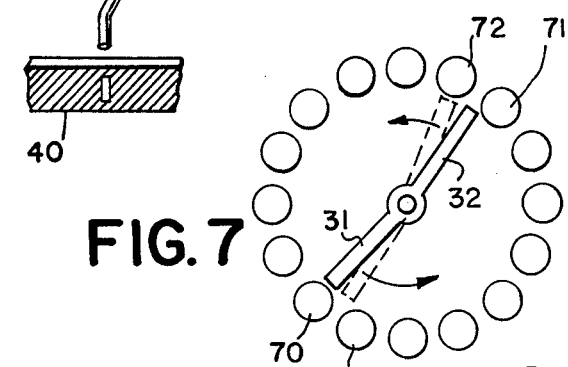
FIG. 7 is a top diagramical view illustrating the path of travel of the arms in accordance with the present invention.

An example of how the balance in accordance with the present invention operates is given below using, for illustrative purposes, the embodiment shown in FIGS. 1-3. In operation, a user would start using balance 10 by first turning on the on/off switch 67 which allows electrical current to flow to the balance. With no weight on pan 12, all of the sixteen support members 20 would be in a vertically lowered position. See support member 28 in FIG. 2. All of the corresponding balls would be resting within the confines of the ball retaining ring 18 as illustrated by ball 29. When a weight is placed on pan 12 as designated by arrow 68, the pan descends vertically causing the two poles of switch 34 to make contact. Since the switch is electrically connected to stepping motor 16, placing a weight on the pan energizes the stepping motor which starts rotating shaft member 15 and thereby rotates arms 31 and 32 about their respective paths. For a postal balance, any weight placed on pan 12 that weighs up to and including one ounce will display a one ounce reading on display panel 40. Thus, when any weight less than or equal to one ounce is placed on the pan, the stepping motor will cause arm 31 to move a distance about a circular path of about 11¼ degrees to the first vertically lowered support member where the cam track within arm 32 will engage the cam follower extending from the support member located in the first position thereby vertically lifting this support member to a vertically extended position. As shown in FIG. 2, when this motion occurs, cup-like end portion 23 is pushed through opening 69 in the bottom portion of the U-shaped channel ball retaining ring 18 and lifts ball 25 vertically so that it no longer rests within the ball retaining ring. As shown in FIG. 7, at the same time that arm 31 is in contact with the support member under ball 70 (the first vertically lowered support member) arm 32 is positioned within its sector midway between the support members under balls 71 and 72 (i.e., about 11¼ degrees from each support member). To provide a more even weight distribution on pan 12 during operation of the scale, arm 32 is positioned to operate alternately on support members that are located diametrically opposite to the support members that arm 31 operates on. At this point in the weighing operation, pan 12 would be in equilibrium with the weight thereon thereby allowing the pan to float to its original position (i.e. the position of the pan without a weight thereon) causing the poles of switch 34 to open, thereby stopping stepping motor 16. The light from light source 35 would project through opening 37 in the arm to the corresponding light pipe whose end portion is positioned thereby. Thus, that part of display panel 40 that shows the number 1 (representing a one ounce weight) would light up.

If, for example, the initial weight placed on pan 12 weighed over one ounce, but less than or equal to two ounces, then after arm 31 caused the lifting of the first ball, the steepping motor would cause arms 31 and 32 to rotate on shaft 15 an additional 11¼ degrees thereby placing arm 31 about midway between support members under balls 70 and 73, and arm 32 at and lifting the support member under ball 72 (see FIG. 7). Thus, as described above, the second ball would be lifted off ball retaining ring 18 and light source 36 would then be positioned over the corresponding light pipe representing a two ounce weight which would light as two ounces on the display panel. Whenever a sufficient number of balls (up to 16) representing the total weight of the object on the pan (up to a total of 16 ounces) have been lifted, in an alternate manner as described, off of the ball retaining ring, pan 12 returns to its original position (its position without any weight) which causes the poles of switch 34 to open and power to be removed from the stepping motor so that it stops rotating. At that point a light will be positioned over a light pipe that corresponds the amount of weight on the pan. In turn, the light pipe conducts light to display screen 40 located on the front portion of the base of the balance correspondingly lighting up a number on the display screen equivalent to the number of balls that have been removed from the ball retaining ring.

When the object being weighed is removed from the balance, pan 12 moves vertically upwards such that the second pole of double pole switch 34 is closed. This causes stepping motor 16 to rotate in a reverse direction thereby causing shaft member 15 and arms 31 and 32 to rotate about their same paths, but in a reverse direction. Thus, if the entire object being weighed is removed from the pan, arms 31 and 32 travel alternately in a reverse direction (i.e. travel at about 11¼ degree movements in each of their respective sectors) about their paths thereby alternately engaging each of the cam followers of support member 20. The support members, which are in a vertically extended position, are then each successively vertically lowered and each of the balls 17 are lowered back down into the ball retaining ring unit 18 in an alternate manner corresponding to the format followed when the balls were removed from the ring unit, but in a reverse manner. The balance mechanism returns to the neutral position which is the zero position if the weight is completely removed from the pan.

The balance in accordance with the features of the present invention is constructed so as to be substantially insensitive to various load shifts or eccentric loads which occur, for example, when the item to be weighed is placed on a corner or an edge of pan 12. The drive mechanism of motor 16 is such that shaft member 15 oscillates slightly about any one of the pole positions of the motor. When, for example, the motor is a stepping motor, the oscillations are made by shaping the current pulses (e.g., reducing the voltage amplitude and/or duration) to having a continual oscillation. This oscillation, which will impart a relatively small rotational relative movement between the supporting shaft 15 and bearings 41 and 42 will allow the pan to adjust axially on the shaft so that any frictional hysterisis will be substantially eliminated.

While this invention has been described in conjunction with specific embodiments therof, it is evident that many alternatives, modifications and variations will be apparent to those skilled in the art. Accordingly, the present invention is intended to embrace all such alternatives, modifications and variations and fall within the spirit and scope of the appended claims.

I claim:
1. A weighing device comprising:
a frame;
a pan element for supporting a load to be weighed;
means connected to said pan for retaining a plurality of weight elements in a vertically movable manner;
a motor supported within said frame;
a shaft member operatively connected to and extending from said motor and supporting said pan element;
a plurality of vertically movable support members moving within means enabling the members to travel in a substantially vertical direction each support member having top end portions adapted to receive and lift one of said weight elements and each including a cam follower extending therefrom;
first and second arms, each secured to said shaft member and extending in a direction toward said support members, each of said arms including a cam track adapted to receive one of said cam followers; and
switching means for energizing said motor when said pan is depressed by a weighted load said motor turning said shaft member and guiding said cam tracks alternately into contact with successive cam followers in a step-by-step manner to vertically move a number of said support members to alternately raise said weight elements diametrically across from each other and thereby lift a corresponding number of said weights substantially equal to the weight of said load.

2. A weighing device comprising:
a frame;
a pan element for supporting a load to be weighed;
means connected to said pan for retaining a plurality of weight elements in a vertically movable manner;
a motor supported within said frame;
a shaft member operatively connected to and extending from said motor and supporting said pan element;
a plurality of vertically movable support members moving within means enabling the members to travel in a substantially vertical direction each support member having top end portions adapted to receive and lift one of said weight elements and each including a cam track therein;
first and second arms, each secured to said shaft member and extending in a direction toward said support members, each of said arms including a cam follower adapted to ride in said cam track; and
switching means for energizing said motor when said pan is depressed by a weighted load said motor turning said shaft member and guiding said cam followers alternately into contact with successive cam tracks in a step-by-step manner to vertically move a number of said support members to alternately raise said weight elements diametrically across from each other and thereby lift a corresponding number of said weights substantially equal to the weight of said load.

3. A weighing device according to claims 1 or 2 wherein said first arm is guided into contact with support members positioned in a first sector while said second arm is alternately guided into contact with support members positioned in a second sector.

4. A weighing device according to claim 3 wherein each of said sectors is about 180 degrees.

5. A weighing device according to claims 1 or 2 wherein said motor is a stepping motor.

6. A weighing device according to claims 1 or 2 further comprising read-out means for visually displaying the weight of said load.

7. A weighing device according to claims 1 or 2 further comprising means to support and retain each of said support members in a lifted position when said support members are supporting one of said weight elements.

* * * * *